United States Patent [19]

Hawranek et al.

[11] Patent Number: 4,958,138

[45] Date of Patent: Sep. 18, 1990

[54] RESISTIVE POSITION INDICATOR

[75] Inventors: Jerzy Hawranek, Vargarda; Karl P. Jakobsson, Alingsas, both of Sweden

[73] Assignee: General Engineering (Netherlands) BV, Utrecht, Netherlands

[21] Appl. No.: 187,447

[22] PCT Filed: Jun. 17, 1987

[86] PCT No.: PCT/SE87/00283

§ 371 Date: Apr. 27, 1988

§ 102(e) Date: Apr. 27, 1988

[87] PCT Pub. No.: WO88/00326

PCT Pub. Date: Jan. 14, 1988

[30] Foreign Application Priority Data

Jun. 27, 1986 [SE] Sweden .................................. 8602892

[51] Int. Cl.⁵ .......................................... H01C 10/10
[52] U.S. Cl. ....................................... 338/114; 338/92; 338/93
[58] Field of Search .................... 338/99, 111, 114, 92, 338/95, 96, 97, 154, 118, 119

[56] References Cited

U.S. PATENT DOCUMENTS

| | | | |
|---|---|---|---|
| 4,314,228 | 2/1982 | Eventoff | 338/114 |
| 4,479,392 | 10/1984 | Froeb et al. | 338/96 X |
| 4,489,302 | 12/1984 | Eventoff | 338/99 |
| 4,651,123 | 3/1987 | Zepp | 338/99 X |
| 4,746,894 | 5/1988 | Zeidman | 338/99 |
| 4,780,701 | 10/1988 | Eppinger | 338/96 X |

Primary Examiner—Bruce A. Reynolds
Assistant Examiner—Marvin M. Lateef
Attorney, Agent, or Firm—Spencer & Frank

[57] ABSTRACT

Resistive position indicator has an enlongated resistive element with an electrical terminal at each end and a tap which can be brought into contact with the resistive element. A contact point divides the resistive element into two portions and is movable along the resistive element, so that the resistance ratio between the two portions of the resistive element can be varied within wide limits. The resistive element consists of a layer of resistive material applied on a substrate of electrically insulating material. The tap comprises an elongated contact portion of electrically conducting material applied on a substrate and positioned in front of, parallel to, and slightly spaced from the resistive element, so that an air gap is formed between the resistive element and the contact portion of the tap. At least one substrate consists of a flexible foil, so that the air gap between the resistive element and the contact portion of the tap can be eliminated at any point along the resistive element by a compressive force on the flexible foil, so that the contact portion of the tap is brought into contact with the resistive layer at that point. The substrates can be a continuous strip of flexible foil which is folded and provided with an insert of insulating material having a slot. The position indicator has low friction, a low weight, and requires little space.

8 Claims, 1 Drawing Sheet

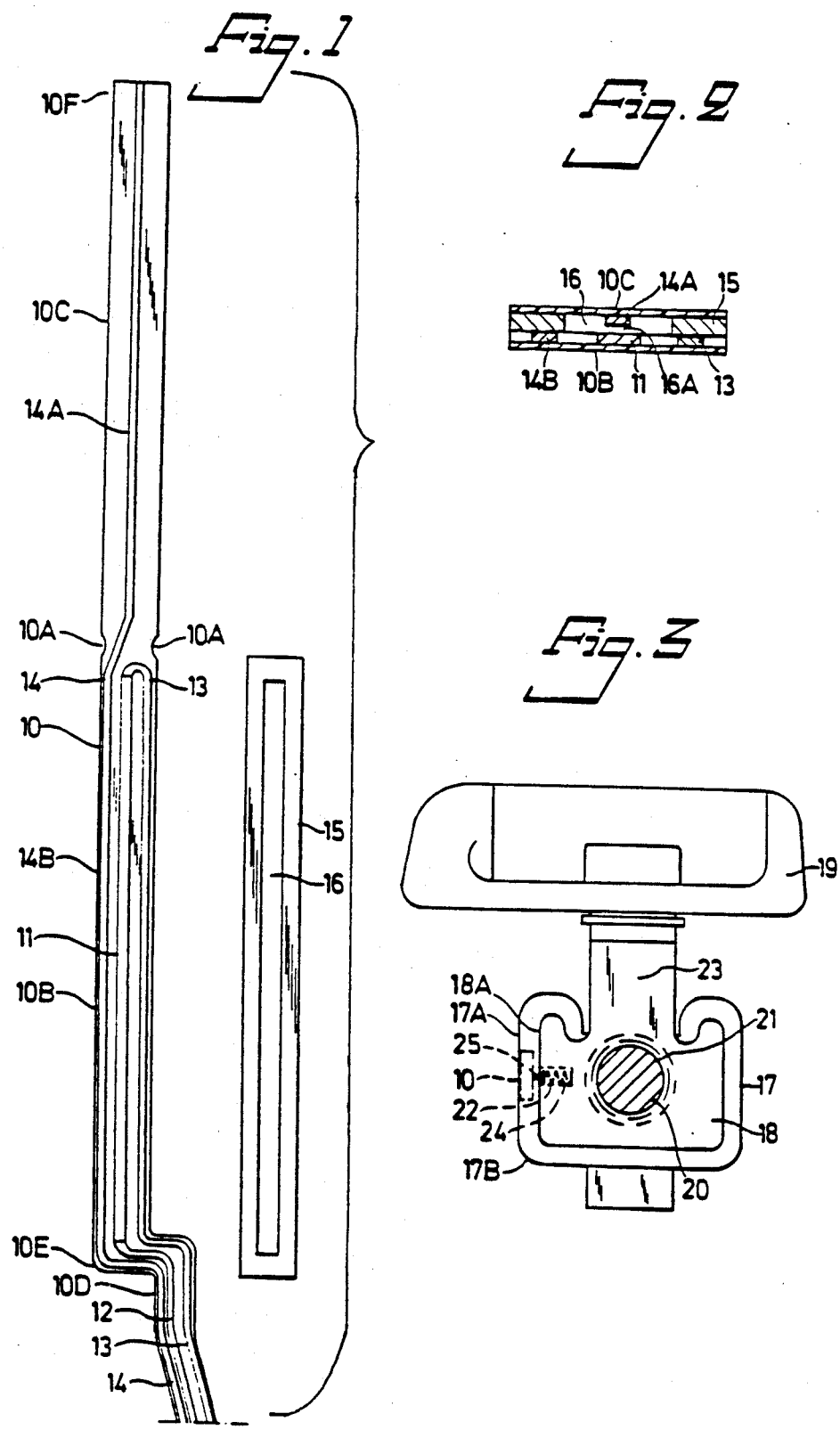

RESISTIVE POSITION INDICATOR

TECHNICAL FIELD

The present invention relates to a resistive position indicator comprising an elongated resistive element having an electrical terminal at each end and a tap means which can be brought into contact with the resistive element. The contact point of the tap means divides the resistive element into two portions and is movable along the resistive element, so that the resistance ratio between the two portions of the resistive element can be varied within wide limits. The position indicator is primarily intended for use in motorized height adjusters for the pillar loop in vehicle safety belts but can also be used in many other devices, e.g. in electrical regulating and controlling equipment.

BACKGROUND ART

Resistive position indicators designed as slide rheostats and rotating potentiometers are previously well known. However, in these indicators a movable tap means is used which abuts against a normally coiled resistive wire or a resistive layer and is moved over the wire turns or the resistive layer when adjusted. This gives a comparatively high friction which causes a heavy wear and a reduced reliability and which also makes the adjustment of the indicator more difficult. Furthermore, these prior art indicators have a comparatively high weight and a compartively large required space.

SUMMARY OF THE INVENTION

The main object of the invention is to provide a resistive position indicator having a substantially lower friction when adjusted than the resistive position indicators of the prior art and also having an extremely low weight and a small required space. According to the invention, this object is achieved by giving the resistive position indicator the features set forth in the claims.

Due to the fact that the tap means comprises an elongated contact portion positioned in front of the resistive element and slightly spaced from this element, so that an air gap is formed between the resistive element and the contact portion of the tap means, and due to the fact that the air gap can be eliminated at any point along the resistive element by a compressive force, there is no means to be moved on the resistive element. This will reduce the friction substantially. Due to the fact that the compressive force can be applied on a flexible foil, only a small compressive force is required to provide the necessary contact between the resistive element and the contact portion of the tap means. Furthermore, the means providing the pressure can slide on the surface of the foil which can be made very smooth, so that the friction when the indicator is adjusted is further reduced. This is a substantial improvement over the resistive indicators of the prior art in which the contact portion of the tap means slides on a resistive surface having high friction.

Particularly, if both the resistive element and the contact portion of the tap means are applied on flexible foils, which can be made very thin, a very thin position indicator is obtained, which has a very small required space and which due to its flexibility easily can be positioned in narrow spaces. In this case, the indicator will also get a very low weight.

BRIEF DESCRIPTION OF THE DRAWINGS

One embodiment of a resistive position indicator according to the invention will now be further described below with reference to the accompanying drawings.

FIG. 1 shows a resistive position indicator, formed on a flexible foil strip, before the final assembly.

FIG. 2 is a cross section through the position indicator according to FIG. 1 after the final assembly.

FIG. 3 is a cross section through a height adjuster for the pillar loop in a vehicle safety belt, the height adjuster being provided with a resistive position indicator according to FIGS. 1 and 2.

DETAILED DESCRIPTION OF THE PREFERRED EMBODIMENTS

The resistive position indicator shown in FIG. 1 comprises an elongated strip 10 of flexible plastic foil. The strip is divided into two portions 10B and 10C of substantially equal length by two notches 10A. The strip is further provided with an angularly projecting extension 10D positioned at the end 10E of the portion 10B turned away from the portion 10C.

Strip 10 has first, second, third, and fourth areas or layers of material 11, 13, 14, and 12 as follows. The first area or thin layer 11 of a material having high resistivity is applied on the strip 10. The first layer is positioned on the longitudinal central axis of the strip and runs along substantially the full length of the first portion 10B of the strip. The first area or layer is at its ends connected to electrical conductors 12 and 13 consisting of fourth and second areas or thin layers of a material having low resistivity. The conductor 12 runs straight to the extension 10D of the strip, while the conductor 13 first runs parallel to the resistive layer 11 on the strip portion 10B to opposite end of the resistive layer and then enters the extension 10D of the strip. The strip 10 is provided with a further electrical conductor 14 consisting of a layer of a third area or material having low resistivity. The conductor 14 runs along the full length of the strip 11 from the free end 10F of the strip over the portions 10C and 10B to the end 10E, where it enters the extension 10D. On the strip portion 10C the portion 14A of the conductor runs on the longitudinal central axis of the strip. On the strip portion 10B the portion 14B of the conductor runs parallel to the resistive layer 11 on the opposite side of that layer in relation to the connecting conductor 13 of the resistive layer.

The strip is intended to be folded 180° at the notches 10A, so that the portion 10C of the strip will be positioned straight over the portion 10B and the conductor 14A on the portion 10C will be positioned straight over the resistive layer 11, as shown in FIG. 2. When the strip is folded, a thin insert 15 of a flexible, electrically insulating material is applied between the two portions 10B and 10C of the strip which are glued together. The insert is provided with a slot 16, the width and length of which correspond to the resistive layer 11. The insert has the same width as the strip 10 and is preferably made of the same foil as the strip 10. The purpose of the insert is to prevent direct contact between the conductor 14A of the portion 10C and the resistive layer 11. Thus, the insert 15 will form an air gap 16A between the resistive layer 11 and the conductor 14A of the portion 10C, when the strip portion 10C during the folding of the strip 10 is positioned on top of the strip portion 10B, as shown in FIG. 2. The strip extension 10D carrying the conductors 12, 13 and 14 is provided with electrical terminals (not shown) for the conductors, so that the position indicator can be connected to a control circuit.

FIG. 3 shows the resistive position indicator applied in a height adjuster for the pillar loop for the strap in a safety belt. The height adjuster comprises a bar 17 which has a substantially U-shaped cross section and in which a carrier 18 for the pillar loop 19 for the strap of the safety belt is movably mounted. The carrier 18 is mounted on a rotatable spindle 20 provided with external threads cooperating with internal threads in a through hole 21 in the carrier, as schematically indicated in FIG. 3. The spindle 20 is connected to a motor (not shown) which can cause the spindle to rotate to move the carrier in the U-shaped bar. A height adjuster of this type is disclosed in greater detail in Swedish Patent Application No. 8505832-9.

For an automatic adjustment of the height adjuster, e.g. depending on a stored code for a particular driver, a position indicator is required which indicates the actual position of the carrier 18 in the height adjuster, so that the carrier can be brought to the desired position. The resistive position indicator according to the invention is applied in the bar of the height adjuster for this purpose, as will be further described below.

The folded strip 10 is attached to the inner side of a side portion 17A. Due to the angular shape the extension 10D of the strip can be positioned along the bottom portion 17B of the bar for connection to external lines. The carrier 18 is on the side 18A facing the strip 10 provided with a hole 22, which is not a through hole and which runs perpendicularly from the surface of the side towards the longitudinal central plane 23 of the carrier. A compression spring 24 is applied in this hole, and one end of the spring abuts against the bottom of the hole and the other end abuts against a pressure element 25 movably mounted in the hole and partially projecting in front of the side 18A of the carrier. The pressure element 25 is so designed that its projecting portion abuts against the strip 10, more particularly against the back side of the strip portion 10C, and forces the conductor 14A against the resistive element 11 at this point. In this position the pressure element 25 is slightly pushed into the hole 22, so that the pressure element is forced by the spring 24 towards the strip 10 to secure a certain contact pressure between the pressure element and the strip 10.

The position indicator in the height adjuster operates in the following way. In operation the resistive layer 11 is connected to a voltage source by means of its connecting conductors 12 and 13, so that a voltage is applied over the resistive layer. When the carrier 18 is moved in the bar 17 by means of the spindle 20, the pressure element 25 in the carrier will be moved on the strip 10, so that the contact point between the conductor 14A and the resistive layer 11 also will be moved along the resistive layer. The voltage which can be tapped from the conductor 14 at its terminal point on the extension 10D of the strip will then vary in relation to the movement of the carrier, so that the obtained voltage can be used to indicate the actual position of the carrier in the bar. The obtained voltage can vary between zero and the peak voltage over the resistive layer supplied by the connected voltage source, depending upon the resistance ratio between the two portions of the resistive layer on either side of the contact point between the conductor 14 and the resistive layer 11 established by the pressure element 25 in the carrier 18.

While only one embodiment of the resistive position indicator according to the invention has been described above and shown on the drawings, it is evident that many variations and modifications are possible within the scope of the invention. The strip does not have to consist of a continuous flexible foil, and the substrate carrying the resistive layer and the conductors may consist of several separate parts. If so, only either the substrate of the resistive layer or the substrate of the portion of the tapping conductor to be brought into contact with the resistive layer needs to be of a flexible material that can be actuated by a pressure element. The insert between the resistive layer and the contact portion of the tapping conductor can also be designed in several ways and may possibly be replaced by a lowering of either the resistive layer or the contact portion of the tapping conductor in the pertaining substrate. The insert can also consist of a double-faced tape, so that the insert produces the connection of the substrates. The resistive layer and the conductors can also be positioned in several ways on the substrate or substrates. The layer and the conductors do not have to be linear but can be of any shape, e.g. curved. The position indicator can then easily be adapted for use in different fields. The contact portion of the tapping conductor does not have to be provided with an electrical terminal, but the contact portion can be adapted to be brought into contact with a conducting layer having low resistivity positioned on the same substrate as the resistive layer and provided with an electrical terminal. The contact portion will then exclusively work as a contact bridge. The resistive layer must have a subtantially higher resistivity than the conductors, but many different resistivity values are possible for the resistive layer as well as for the conductors. The thickness and width of the layers can also be changed within wide limits. If the contact portion of the tapping conductor does not work exclusively as a contact bridge, it is convenient that the resistive layer has a larger width than the contact portion of the tapping conductor, so that the required accuracy at the folding of the strip or at the connection of the substrates will not be too high. The terminal points of the position indicator do not necessarily have to be positioned at one end of the position indicator or not even adjacent each other, but it is easier to connect the external lines, if the terminal points are positioned adjacent each other.

What is claimed is:

1. A resistive position indicator comprising: an insulating substrate; a first area of conductive material on said substrate comprising an elongated resistive element; a second area of conductive material on said substrate comprising an elongated conductor, extending substantially parallel with said resistive element, and being connected thereto at one end; a respective terminal provided at the other end of said resistive element and of said conductor adjacent one end of said substrate; a third elongated area of conductive material on said substrate, extending substantially parallel with said first and second areas and having a terminal at the same end of said substrate as the other terminals; a tap means, connected to said third area, for contacting said resistive element at a contact point which is movable along the resistive element and divides the resistive element into two portions so that the resistance ratio between the two portions of the resistance element can be varied between wide limits, said tap means including an elongated area of low resistivity electrically conducting material which is applied to an insulating supporting substrate, extending parallel to and slightly spaced from said substrate carrying said first, second, and third areas of conductive material, and which has a contact portion positioned in front of, parallel to, and slightly spaced from said resistive element and defining an air gap between said resistive element and said contact portion; and at least one of said substrate and said supporting substrate consisting of a flexible foil so that adjacent points on said contact portion of said tap means and on said resistive element can be brought into contact, and close said air gap between said resistive element and said contact portion, at any point along said resistive element by means of a compressive force on said flexible foil to establish said contact point.

2. A resistive position indicator according to claim 1, wherein said first area forming said resistive element is centrally disposed between said second and third conductive areas, and further comprising insulating means disposed between said second and third conductive areas and said supporting substrate carrying said tap means.

3. A resistive position indicator according to claim 2, wherein said substrate and said supporting substrate consist of different portions of a single flexible foil strip, said flexible foil strip is folded back on itself between said two portions, so that said two portions of said strip face each other, and said tap means, on one portion of said strip, is formed integrally with said third conductive area which is formed on the other portion of said strip.

4. A resistive position indicator according to claim 2, wherein said insulating means comprises an insert of flexible insulating material disposed between said insulating substrate and said insulating supporting substrate, said insulating insert having an elongated slot therein between said resistive element and said contact portion of said tap means.

5. A resistive position indicator according to claim 1, wherein said substrate and said supporting substrate consist of different portions of a single flexible foil strip, said flexible foil strip is folded back on itself between said two portions, so that said two portions of said strip face each other, and said tap means, on one portion of said strip, is formed integrally with said third conductive area which is formed on the other portion of said strip.

6. A resistive position indicator according to claim 1, wherein each one of said insulating substrate and said insulating supporting substrate is a flexible foil.

7. A resistive position indicator according to claim 6, wherein each one of said insulating substrate and said insulating supporting substrate is a different portion of an integral flexible foil, and said integral flexible foil is folded 180 degrees so that said insulating and insulating supporting substrates face each other.

8. A resistive position indicator according to claim 6, wherein said resistive element is broader than said contact portion of said tap means, and said flexible foil comprising said insulating supporting substrate is adapted to be forced against said flexible foil comprising said insulating substrate for establishing the contact between said contact portion and said resistive element at said contact point.

* * * * *